United States Patent [19]
Forward

[11] Patent Number: 4,586,456
[45] Date of Patent: May 6, 1986

[54] INFLATABLE BALLOON DISTRESS MARKER HAVING SMALL ARTICLE CONTAINING COMPARTMENT THEREIN

[76] Inventor: Ross M. Forward, 4714 Jubilee Rd., Halifax, N.S., Canada, B3H 2H8

[21] Appl. No.: 616,179

[22] Filed: Jun. 1, 1984

[51] Int. Cl.⁴ .............................................. B64B 1/40
[52] U.S. Cl. ............................ 116/210; 116/DIG. 8; 116/DIG. 9; 40/215; 206/803; 244/33; 403/299; 441/6; 441/13; 441/30; 446/220; 446/222; 446/485; 273/58 G; 273/65 D
[58] Field of Search .................. 40/215; 116/209, 210, 116/DIG. 8, DIG. 9; 244/31, 33, 98; 403/296, 299; 441/6, 11, 13, 16, 30; 446/220, 222, 223, 225, 226, 485; 206/522, 573, 803; 273/58 C, 58 G, 65 D; 73/170 R

[56] References Cited
U.S. PATENT DOCUMENTS

| | | | |
|---|---|---|---|
| 2,230,138 | 1/1941 | Ewart | 446/220 |
| 2,475,839 | 7/1949 | Jalbert | 244/31 |
| 3,229,517 | 1/1966 | Smith | 73/170 R |
| 3,310,024 | 3/1967 | McConnell | 116/DIG. 9 |
| 3,381,655 | 5/1968 | Rozzelle | 116/210 |
| 3,397,887 | 8/1968 | Caplan | 116/DIG. 9 |
| 3,526,202 | 9/1970 | Graulich | 116/210 |
| 3,735,723 | 5/1973 | Lutz | 116/210 |
| 3,945,338 | 3/1976 | Correa | 116/210 |
| 4,094,267 | 6/1978 | Davis, Jr. | 116/DIG. 9 |
| 4,433,638 | 2/1984 | Ashline | 116/210 |

FOREIGN PATENT DOCUMENTS

| | | | |
|---|---|---|---|
| 13590 | 6/1903 | Austria | 244/31 |
| 2906850 | 8/1979 | Fed. Rep. of Germany | 206/522 |
| 768636 | 8/1934 | France | 273/58 C |
| 1133254 | 11/1968 | United Kingdom | 116/210 |

*Primary Examiner*—Charles Frankfort
*Assistant Examiner*—W. Morris Worth
*Attorney, Agent, or Firm*—Stanley E. Johnson

[57] ABSTRACT

A balloon distress marker wherein the balloon has, in a wall thereof, a small compartment interiorly of the balloon and accessible through an aperture in the wall of the balloon for retaining an article therein. The compartment is substantially smaller than the volumne of the balloon and is useable for interconnecting balloons in series or inserting a flashlight therein to illuminate the balloon. A coupling for interconnecting balloons is preferably a small balloon in itself which can be inflated when in the compartment. A two-part balloon wherein the two parts are interconnected by a narrow neck portion rendering the marker useable as a life preserver. A rescue kit consisting of a casing having a removable top that can be illuminated by flashlights in the cap. Located within the container is a cylinder containing lighter-than-air gas for inflating the balloon. A reel is rotatably mounted on the neck of the cartridge and freely rotatable for winding in and paying out a tether line connected to a deflated balloon in the container. An additional collapsible floatation chamber is mountable on the exterior of the casing adapting the kit for use at sea.

14 Claims, 17 Drawing Figures

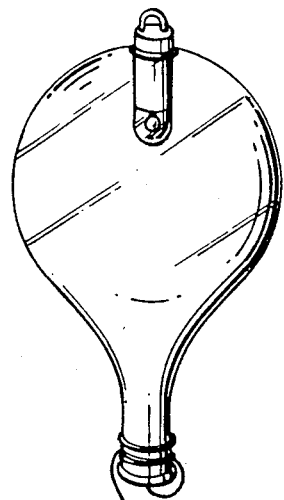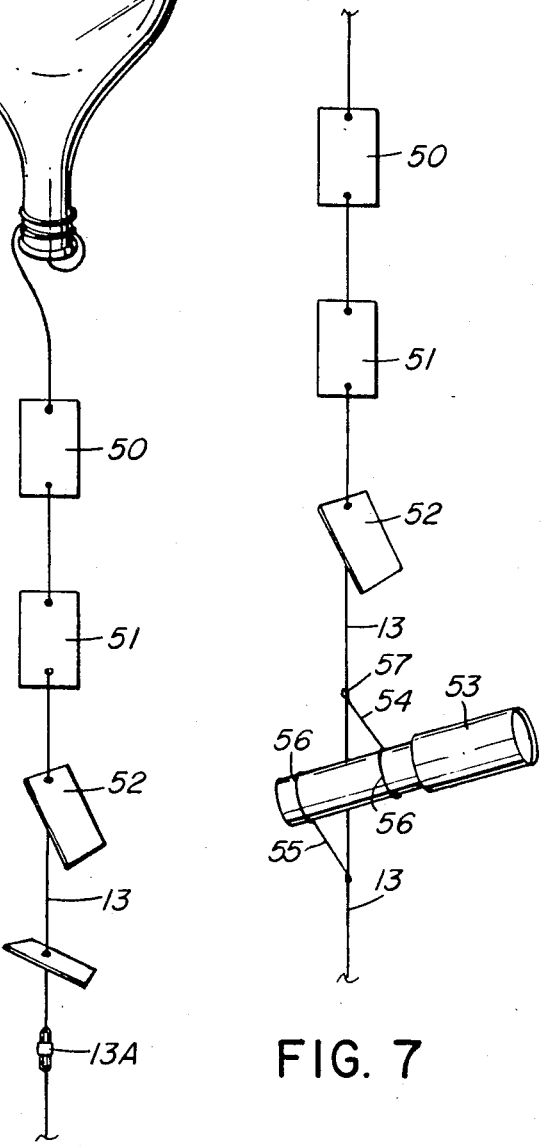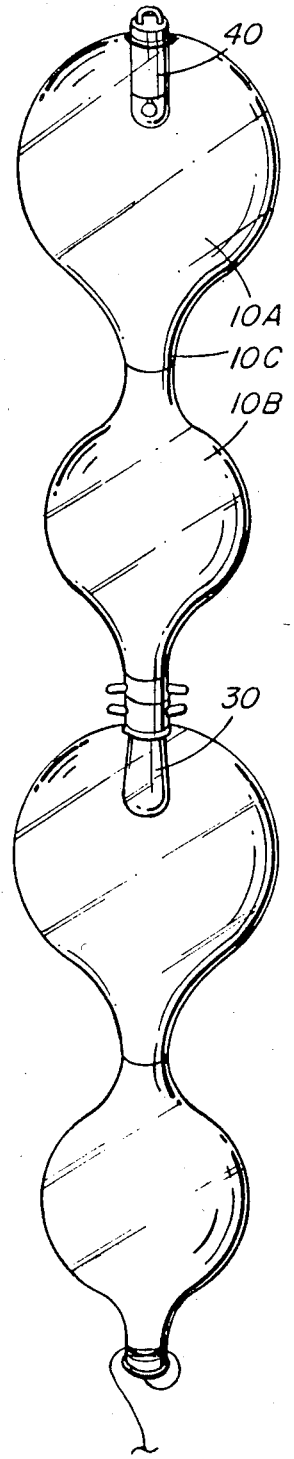
FIG. 6
FIG. 7
FIG. 8

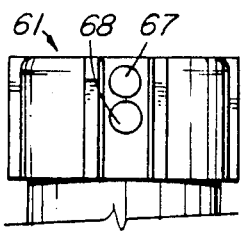
FIG. 12
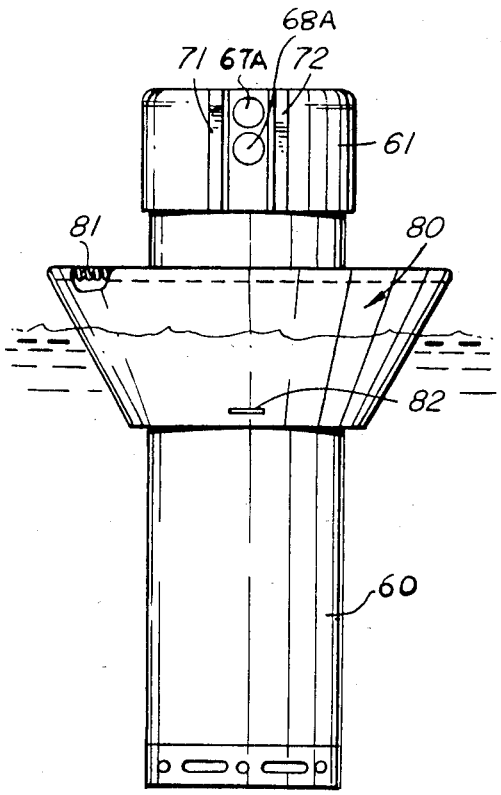
FIG. 14
FIG. 13
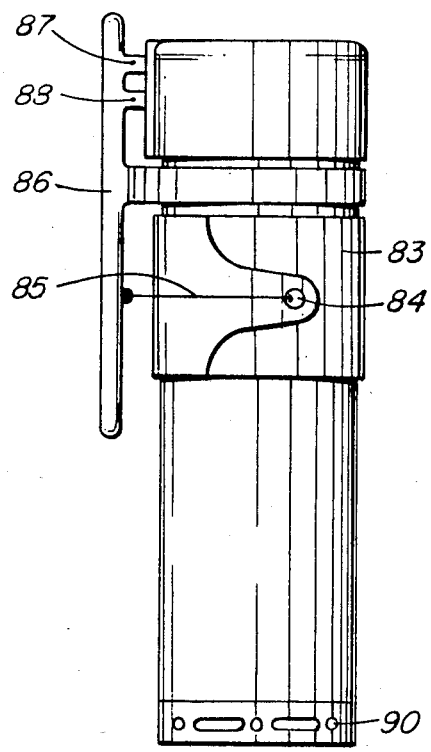
FIG. 15
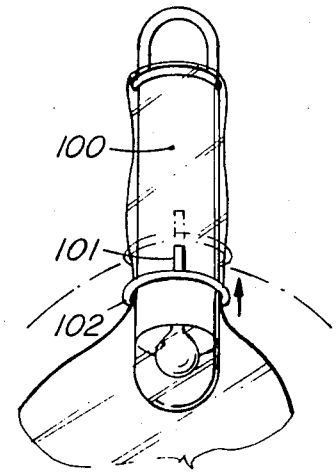
FIG. 16

INFLATABLE BALLOON DISTRESS MARKER HAVING SMALL ARTICLE CONTAINING COMPARTMENT THEREIN

This invention relates generally to a distress marker and more particularly to a balloon for use as a distress marker and a kit containing such balloon. The kit is of a size that may be readily carried in a person's pocket or on ones belt.

When hunting, fishing, or going into remote areas, one sometimes becomes lost or otherwise in distress and rescue of the victim is often delayed because of search and rescue teams being unable to locate the victim. Various devices are known for marking the location of the victim and are referred to as distress markers, spotting devices, signal balloons, personal rescue aids and in most all cases consist of a deflated balloon, an anchor line attached to the balloon and lighter-than-air gas supply means for inflating the balloon. In some cases the rescue aids also include a signal device or devices. In most instances the prior art devices are complicated and thus expensive and/or bulky, rendering them unsuitable for personal use. The balloons also used in the prior devices are nothing more than a simple bag having no other purpose than to confine lighter-than-air gas so that the balloon will rise in the air.

A principal object of the present invention is to provide a particularly constructed balloon to fulfill multifunctions and which may be used in existing and known rescue aids.

A further principal object is to provide a marker or spotting device which will be easily and readily seen at a distance during not only daylight hours but also during the hours of darkness.

A further object of the present invention is to provide multi-stage balloons readily interconnectible with one another in series for additional lift and/or an enlarged object more readily spotted in the air.

A further object of the present invention is to provide a balloon adapted for use as a rescue marker and life preserver for a victim awaiting rescue.

A further object of the present invention is to provide a compact and lightweight rescue aid kit.

In keeping with the foregoing there is provided in accordance with one aspect of the present invention an inflatable balloon made of thin, tough, air impervious material and having a small compartment interiorly thereof accessible through an aperture in the wall of the balloon for retaining an article therein. The compartment is provided, preferably by a casing integrally formed as a component part of the balloon and having at the juncture of the wall of the balloon and the casing a rib to facilitate retaining an article in the compartment and form a seal therewith.

In accordance with a further aspect of the present invention, there is provided a balloon generally in the shape of a dumb-bell consisting of first and second inflatable portions interconnected by a narrow neck and wherein one of said inflatable portions have a compartment therein as defined in the preceding paragraph.

In accordance with another aspect of the present invention there is provided a rescue kit comprising a container having a removable cap, a cylinder containing a lighter-than-air gas under pressure, an inflatable balloon, a reel rotatably mounted on a neck portion of said gas cylinder and a tether line wound on said reel and connected to said balloon.

The invention is illustrated by way of example in the accompanying drawings wherein:

FIGS. 6 and 7 are elevational views showing the balloon in flight and tethered and including additional signal means on the tether line;

FIG. 8 is an elevational view illustrating a modification to the balloon provided in accordance with the present invention;

FIG. 12 is a right-hand partial elevational view of the kit shown in FIG. 10;

FIG. 13 is a top plan view of FIG. 12;

FIG. 14 is an elevational view illustrating a modification to the rescue kit;

FIG. 15 is an elevational view illustrating a further modification to the kit;

FIG. 16 is a partial elevational view of the bottom end of the balloon illustrating a further modification.

Figure 1:
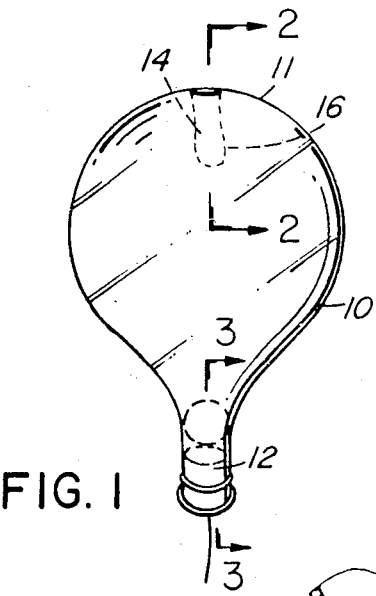
FIG. 1 is an elevational view of a balloon provided in accordance with the present invention.
Figure 2:
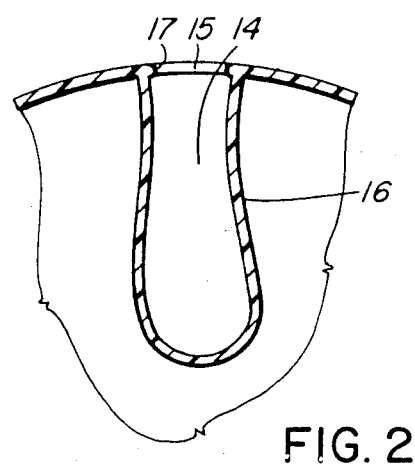
FIG. 2 is a partial section taken essentially along line 2—2 of FIG. 1.
Figure 3:
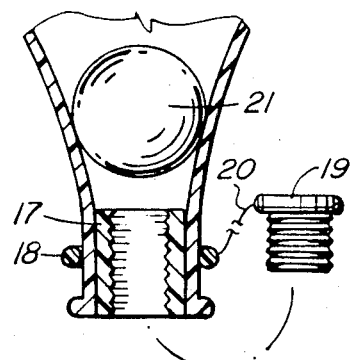
FIG. 3 is a partial section taken essentially along line 3—3 of FIG. 1.

Referring in detail to the drawings, illustrated in FIG. 1 is an inflatable balloon 10 having respective opposite upper and lower ends 11 and 12 with reference to the in-flight tethered position. The lower end 12 of the balloon is connected to a tether line 13 having a miniature rust-proof swivel 13A therein. The body of the balloon is preferably made of a thin, tough, material, colored or coated with a luminous substance and is translucent so as to glow when illuminated from the interior by a light source. The balloon is effectively a hollow bag and while preferably made of material such as rubber, plastics or the like, it may instead be made of silk or any other tough, light and non-porous material.

Figure 4:
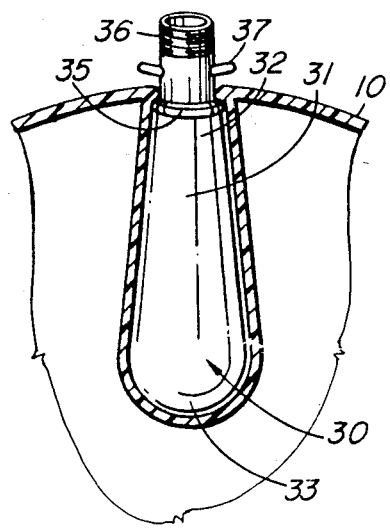
FIG. 4 is similar to FIG. 2 illustrating a coupling element for interconnecting two balloons in series.

The balloon 10 has a small compartment 14 disposed interiorly thereof, accessible through an aperture 15 in the wall of the balloon. The compartment 14 is preferably at the upper end as illustrated in FIG. 1 for purposes which will become more apparent hereinafter but for limited use could be located anywhere. The volume of the compartment 14 is extremely small relative to the interior volume of the balloon proper and in one instance, as illustrated in FIG. 6, has a flashlight 40 therein for illuminating the balloon and in another instance, as illustrated in FIG. 4, retains a coupling 30 for interconnecting two balloons in series. By using further couplings, as many balloons may be connected in series as desired providing the lift required for the purpose, avoiding use of an overly large diameter that would be necessary with a single balloon. The compartment 14 is provided by a casing 16 disposed interiorly of the balloon and while it may be a separate component attached to the wall of the balloon it is preferably integrally formed therewith as a component part of the balloon. At the juncture of the wall of the balloon and the casing 16 there is a rib or grommet 17 of elastic material and incorporated in the balloon for the purpose of (a) retaining the coupling or the flashlight in the compartment; and (b) forming a seal between the article contained in the compartment and the compartment. The seal prevents ingress of water into the compartment when the latter is occupied by the light source and also prevents the escape of air from the compartment when inflating the balloon. The air entrapped between the flashlight and the wall provides an air space whereby heat from the bulb of the flashlight readily circulates around the flashlight providing warmth and thereby extending the lift or increasing output of the storage battery associated with the flashlight.

There is inserted in the lower end 12 of the balloon an internally threaded coupling 17 anchored in position by an elastic 'O'-ring 18 to which a threaded plug 19 is attached by a tether or captive line 20.

The balloon 10 has a neck portion that tapers downwardly toward the end 12 and interiorly of the balloon there is located a hollow spherical ball 21 that serves as a valve when the balloon is in upright position, preventing loss of pressure when the balloon is inflated.

In FIG. 4 there is illustrated an adapter 30 in the compartment 14 of the balloon 10 for interconnecting two balloons in series. The adapter or connector 30 consists of elongate plug member 31, preferably increasing in size from the end 32 thereof toward the opposite end 33. If desired, a rib 35 (or a groove) may be located at the end 32 to facilitate locking the connector in the compartment 16 by engagement with the rib or grommet 17 on the balloon. Beyond the end 32 is a threaded spiggot 36 provided with protrusions 37 which facilitate turning it into the internally threaded coupling 17 in the lower end of another balloon. The plug member 31 is preferably a hollow light weight member and can be either rigid or flexible. The plug, when flexible, is preferably inflatable (i.e. a small balloon) using either pressure from the balloon into which spiggot 36 is threaded (or alternatively a separate pressure source) to inflate it. In case of the latter, spiggot 36 should be provided with a suitable valved opening.

Figure 5:
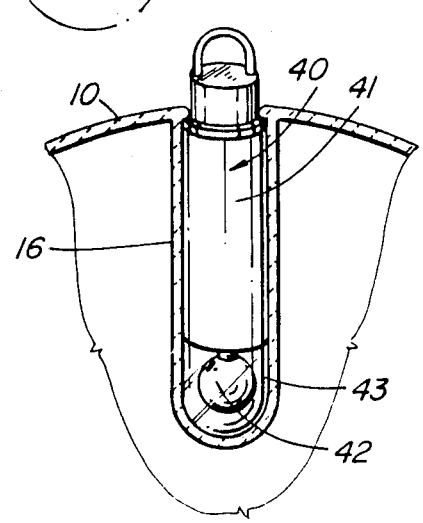
FIG. 5 is similar to FIG. 2 illustrating a lamp for illuminating the balloon.

In the embodiment illustrated in FIG. 5 a light source, consisting of a flashlight 40, is located in the compartment 14. The flashlight consists of a casing 41 having batteries located therein and bulb 42 disposed in a transparent or translucent cap portion 43 of the casing. The wall of the balloon 10, bulb 42, cap 43 and/or the compartment wall 16 contains material (or has a coating thereon) enhancing distribution and scattering of the light so that the balloon may be more easily and readily observed. The illuminated balloon can be likened to a Japanese lantern in which there is an even distribution of light on the outer surface.

To further attract attention, light weight, semi-rigid light reflecting plates 50, 51 and 52 and/or a flare 53 are attached to the tether line 13 (see FIGS. 6 and 7). The reflecting plates may be metal, plastic or any other suitable material having light reflective surfaces thereon and are thin enough so that they may be readily rolled up for insertion into a container as will be described hereinafter. The plates constantly move, maximizing reflection of light in all directions. As illustrated in FIG. 6 and 7, reflective plates 50 and 51 each have two apertures therein through which the tether line passes and plate 52 has a single aperture. Various other arrangements may be utilized, placing the reflective surfaces at different angles for reflecting light from the balloon and/or sky radiation and/or sunlight. The reflective plates may be retained and positioned in any manner as, for example, knotting the tether line at appropriate positions relative to the plates.

The flare 53 is attached to the tether line 13 by respective snare lines 54 and 55. Each of the snare lines have a loop 56 at one end thereof formed, for example, as a snare from a slip knot through which a portion of the flare is inserted and end 57 attached to the tether line 13. The looped ends 56 are movable toward and away from one another longitudinally along the flare selectively to adjust the angle of the flare relative to the tether line 13 and/or similar adjustment may be made by moving the ends 57 of the respective snare lines 54 and 55 toward and away from one another longitudinally along the tether line 13. It will be obvious anything added to the tether line 13 adds weight which may necessitate additional lift by the balloon. This additional lift can be provided by attaching two or more balloons in series utilizing, for example, the coupling illustrated in FIG. 4.

Figure 9:
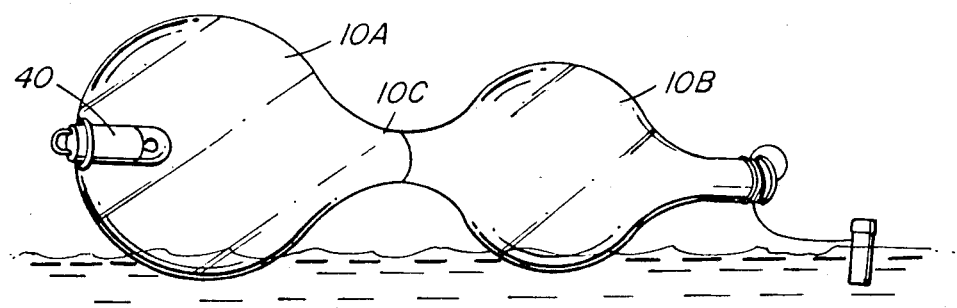
FIG. 9 is an elevational view showing the balloon of FIG. 8 floating on a body of water.

In FIGS. 8 and 9 there is illustrated a modified balloon which consists of inflatable portions 10A and 10B interconnected by a substantially non-expandable neck portion 10C the shape of which may be referred generally as 'dumb-bell'. The neck 10C is hollow providing communication from one to the other of balloons 10A and 10B. The uppermost balloon 10A has a compartment 14 therein described earlier with reference to FIGS. 1, 2, 4 and 5 and which is usable to interconnect balloons in series or include a light source. Of course when balloons are connected in series the light source will be located in the uppermost balloon. The serially arranged double balloons provide additional lift without requiring a balloon of undue diameter that would be necessary if a single balloon were to provide the same lift. As illustrated in FIG. 9 the double balloon is also useful as a marker on water and also can serve as a life preserver. The narrow neck portion 10C provides convenient means for a victim to straddle or lie on the preserver while awaiting rescue. When used as a preserver the balloon need only be filled with air, saving helium or any other lighter-than-air gas used to send the balloon aloft. The light source 40 in the end of the balloon illuminates the latter at night providing an illuminated life preserver and/or marker.

The respective balloons 10A and 10B may be of the same or different size relative to one another, but preferably the upper balloon is larger than the lower balloon and the two balloon portions are preferably of different color. The upper balloon is normally a brighter color than the lower balloon and in most cases would be a fluorescent international distress orange color. By having the larger balloon located uppermost it is more visible.

Figures 10, 11:
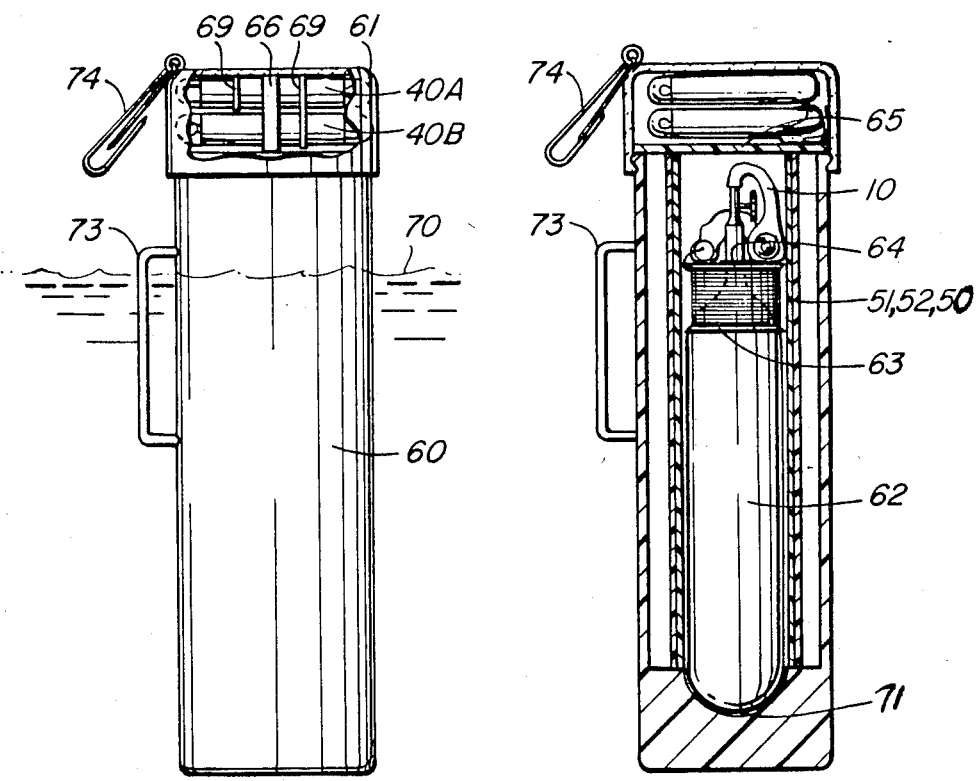
FIG. 10 is an elevational view of a rescue kit provided in accordance with the present invention.
FIG. 11 is a vertical sectional view of FIG. 10 and including a modification.

Referring to FIGS. 10 and 11, there is illustrated a rescue aid kit which includes a container (or capsule) 60 (having a removable translucent cap 61) housing a balloon 10 attached to the valve outlet of a cylinder 62 containing a lighter-than-air gas under pressure and a reel 63 on which the tether line is wound. The reel 63 is mounted on the neck of the gas cylinder 62 and retained in position by a collar 64. The reel is rotatable so as to spin freely on the neck of the cylinder and has an inner surface corresponding to the neck so as to reduce space required within the container. Reflectors 50, 51 and 52 are rolled one within the other and surround the cylinder 62. The cap 61 is press-fit (or alternatively threaded) tightly onto the upper open end of the container so as to be water-tight. A removable disc or plate 65 is located within the cap providing a compartment 66 in which there is located two oppositely directed flashlights designated respectively 40A and 40B for illuminating the cap (see FIG. 10). The disc preferably fits tightly in the cap and is provided with a ring or strap facilitating its removal. The flashlights 40A and 40B are retained in the cap by way of a clip 66 and are shiftable from one side of the cap toward the other a limited amount by application of finger pressure to respective ones of a pair of soft or resilient areas 67 or 68 on one side of the cap (see FIG. 12) or in the opposite direction by respective softened or resilient area 67A and 68A on an opposite side of the cap (see FIG. 14). Each flashlight has a switch (not shown) associated therewith cooperating with respective ones of a pair of protrusions 69 interiorly of the cap (or alternatively the clip 66) such that when the flashlight is shifted in one direction, the flashlight is turned on and when shifted in the other direction it is turned off. As previously mentioned the cap 61 is made of a translucent material and thus when the flashlights are lit, the cap is illuminated so that the kit itself can serve as a marker. The deflated balloon 10 in the container has a flashlight in the compartment of the balloon (as illustrated in FIG. 5) for illuminating the balloon when air-borne. The kit preferably has sufficient buoyancy to float and the weight distribution such that when floating in water it is upright (as illustrated in FIG. 10) with the cap being above the surface of the water 70. The bottom end of the container has a recess 71 corresponding in shape to the bottom end of the cylinder 62, appropriately locating the latter in position in the container. The soft or resilient areas 67, 67A, 68 and 68A may, if desired, be replaced by buttons but this is undesirable as it is most difficult to obtain a water-tight seal preventing water from getting into the compartment containing the flashlights. The soft or resilient area 67, 67A, 68 and 68A are located between pairs of spaced apart ribs 72 preventing accidentally turning on the flashlights when handling the kit.

The kit is intended to be carried by an individual and to facilitate doing so there is provided a loop 73 (or alternatively a clip) for mounting the kit on one's belt or retaining it in ones pocket and/or a clip 74. Clip 74 may be a safety pin type for attachment to clothing, lift jacket, etc. by piercing the material. The loop 73 on the side of the container may be suitably constructed to serve as a handle for winding in the tether line.

It is intended the complete unit or kit weight approximately 1½ lbs. and thus readily carried by an individual. In case of an emergency it is only necessary to open the end of the capsule, pull out the cylinder and turn on the valve to inflate the balloon attached to the cylinder. As the balloon becomes air-borne, the tether line unwinds from the freely rotatable reel taking therewith the reflectors. The flashlight in the end of the balloon can be turned on by the victim or, alternatively, suitable switching for the flashlight can be provided which turns the flashlight on automatically upon inflation of the balloon.

In FIG. 14 there is illustrated a further modification wherein there is included on the casing 60 an additional buoyancy body 80 which is collapsible and in FIG. 14 is shown in the expanded position. The buoyancy body 80 consists of a flexible, preferably transparent, wall attached to the outer surface of the capsule and retained in the expanded position by a spring 81. The floatation device is effectively an air chamber surrounding the casing and as it is being expanded by the spring, air enters the chamber by way of a valved opening 82. The additional floatation device is normally held in a collapsed position by a band 83 (see FIG. 15) having a quick release snap fastener 84. The tab containing the snap fastener 84 can, if desired, be connected by way of a line 85 to a clip 86 having projections 87 and 88 thereon for shifting the flashlights in the cap to turn the same on as the clip is removed and at the same time remove the band 83 releasing the floatation device for expansion.

In the embodiment illustrated in FIGS. 14 and 15, air holes 90 are provided at the bottom end of the casing and these air holes are appropriately designed to provide a whistle when air flows or is caused to flow therethrough.

In FIG. 16 there is illustrated a still further modification wherein a flashlight 100 having a switch 101 is inserted in the neck of the balloon and adjacent the switch there is a flexible elastic 'O'-ring 102. As the balloon expands when it is being inflated the 'O'-ring rolls along the flashlight, shifting the switch causing the flashlight to be turned on. Alternatively, the switching mechanism on the flashlight may be a pressure sensitive device and arranged so that when the flexible elastic 'O'-ring flips off, the flashlight will automatically be turned on.

Figure 17:
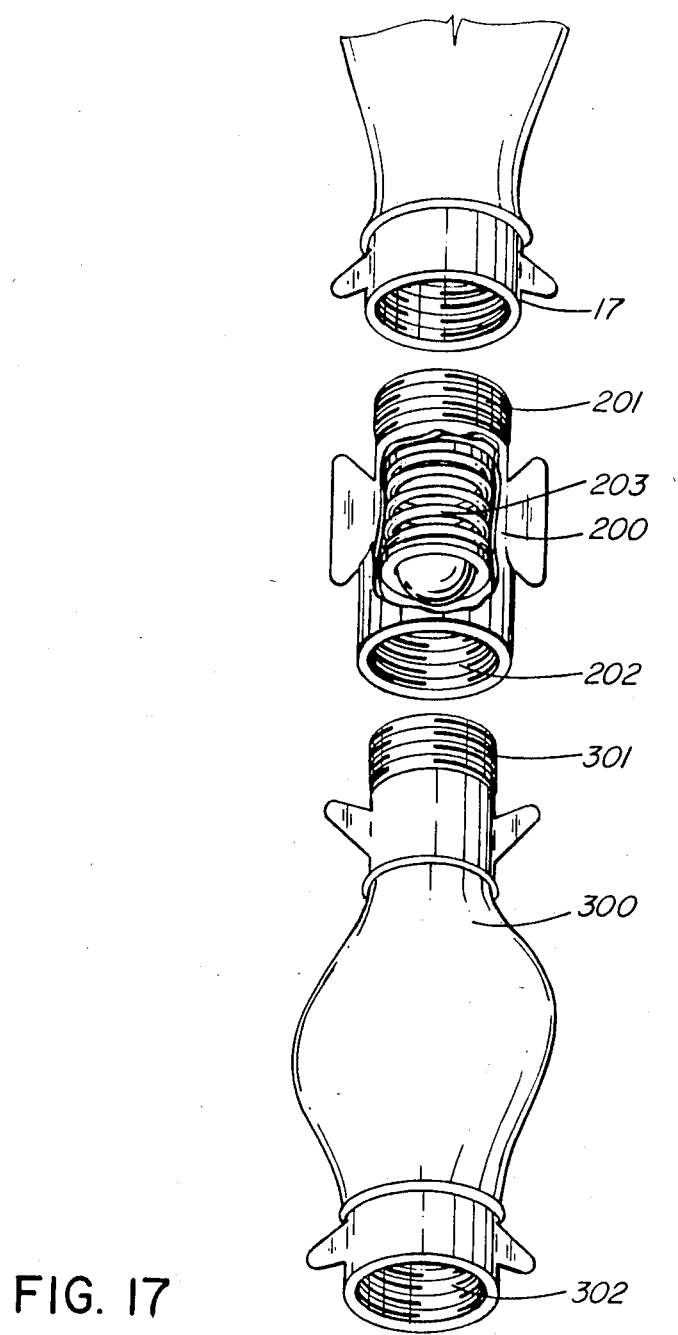
FIG. 17 is an exploded view illustrating adapters for use in association with the balloon.

In FIG. 17 there is illustrated an adapter 200 having respectively male and female threaded ends 201 and 202 and a check valve 203 disposed therebetween. The coupling 200 can be threaded into coupling 17 in the lower end of a balloon attaching thereto a burstable balloon 300 for giving a loud audible signal when the balloons are air borne. The balloon 300 is a small balloon weaker in pressure strength than the main balloon. The balloon 300 has respective male and female couplings 301 and 302 at opposite ends thereof. The small balloon exploding arrangement also eliminates the fear of bursting the main balloon when one is excited or in a hurry.

I claim:

1. A rescue marker comprising an inflatable balloon made of thin, tough, air impervious material and having an open ended tapered neck, a ball loose within the balloon and cooperating with said tapered neck providing a valved air inlet to said balloon for use in inflating said balloon, a casing projecting into said balloon from a wall thereof and providing a compartment interiorly of the balloon, said casing being integrally formed as a component part of the balloon and having, at the juncture of the wall of the balloon and the casing, a narrow rib that circumscribes an aperture in the wall of the balloon and which aperture provides an access opening to said compartment permitting insertion of an article thereinto, said rib facilitating retaining said article in the compartment and permitting removal of said article from said compartment, said rib also forming a seal with such article, said compartment and said valved air inlet being separate from one another and located at respective positions spaced apart from one another on the wall of the balloon opposite to one another on said balloon, said compartment being extremely small in volume relative to the internal volume of the balloon, and having a cross-section interiorly of the balloon larger than the size of the aperture providing access thereto.

2. A rescue marker as defined in claim 1 including a coupling having an expandable portion inserted into the compartment of said balloon, said coupling being detachably connected to a neck of a second similar balloon, thereby directly connecting said balloons in series.

3. A resuce marker as defined in claim 2 wherein said coupling expandable portion comprises a small inflatable balloon.

4. A rescue marker as defined in claim 1 wherein the balloon is generally in a shape of a 'dumb-bell' consisting of first and second portions merged together at a narrow neck between said portions and wherein one of said portions has said compartment therein and the other has said valved air inlet tapered neck.

5. A rescue kit comprising a container having a removable cap, a cylinder having a neck and containing a lighter-than-air gas under pressure located in said container, a reel rotatably mounted on the neck of said cylinder and in co-axial relation therewith, a tether line wound on said reel for attaching to a balloon and a deflated inflatable balloon located in said container and removable therefrom, said balloon being made of thin, tough, air impervious material, a valved air inlet to said balloon for use in inflating said balloon by said lighter-than-air gas, a casing projecting into said balloon from a wall thereof and providing a compartment interiorly of the balloon, said casing having an extremely small volume relative to the internal volume of the balloon said compartment being accessible through an aperture in the wall of the balloon, said aperture being smaller in cross-section than a cross-section of the compartment in the balloon, a narrow rib circumscribing said aperture, said aperture providing an access opening to said compartment permitting insertion of an article thereinto, said rib facilitating retaining said article in the compartment and permitting removal of said article from said compartment, said compartment and said valved air inlet being separate from one another and located at respective positions spaced apart from one another on the wall of the balloon and opposite one another.

6. A rescue kit as defined in claim 5 wherein said removable cap is made of a translucent material and wherein a light source is mounted in said cap for illuminating the cap.

7. A rescue kit as defined in claim 6 wherein said light source is a flashlight removably mounted in said cap.

8. A rescue kit as defined in claim 5 including an expandable and collapsible additional buoyancy body attached to and surrounding a portion of said container.

9. A rescue kit as defined in claim 5 including at least one flashlight mounted detachably in said removable cap.

10. A rescue kit as defined in claim 9 including means on said container for use in actuating a switch on the flashlight.

11. A rescue marker comprising a balloon made of thin, tough, air impervious material and having an open ended tapered neck, a ball loose within said balloon and cooperating with said tapered neck providing a valved air inlet in said balloon for use in inflating the balloon, a compartment projecting interiorly of the balloon from the wall thereof and being provided by a casing integrally formed as a component part of the balloon, said compartment being accessible through an aperture in a wall of the balloon and located opposite the valved air inlet, said compartment being extremely small relative to the internal volume of the balloon, and a connector for detachably interconnecting said balloon with another balloon, said connector having a first portion insertable into said compartment and inflatable to fill said compartment and removable from said compartment upon deflation of said first portion, and a second portion attached to said first portion and detachably connectable to said another balloon.

12. A rescue marker as defined in claim 11, wherein said first portion of the connector comprises a small inflatable balloon.

13. A rescue marker as defined in claim 12, wherein there is a rib at the juncture of the wall of the balloon and the casing to facilitate retaining the first portion of the connector in said compartment.

14. A rescue kit comprising a container having a removable cap; a cylinder having a neck and containing a lighter-than-air gas under pressure located in said container; an inflatable balloon disposed within said container and removable therefrom, said inflatable balloon being made of thin, tough, air impervious material that forms the outer wall of said balloon and having a casing integrally formed therewith and projecting into the balloon providing a compartment interiorly of the balloon, said compartment being extremely small in volume relative to the volume of the balloon, an aperture in the wall of the balloon providing access to the compartment permitting removable insertion of an article thereinto; a coupling having a small inflatable balloon portion insertable into said compartment of said larger inflatable balloon and means attached to said small balloon and connectable to another larger inflatable balloon so as to detachably interconnect the larger balloons in series; a reel rotatably mounted on the neck portion of said cylinder and disposed co-axially therewith and a tether line wound on said reel and connected to one of said larger balloons.

* * * * *